United States Patent [19]

Owen et al.

[11] 4,314,712
[45] Feb. 9, 1982

[54] POLE TRAILER

[76] Inventors: Edward E. Owen, Hwy. 49, Bond, Miss. 39550; James F. Loveless, Rte. 1, Box 189, Brooklyn, Miss. 39425

[21] Appl. No.: 73,631

[22] Filed: Sep. 10, 1979

[51] Int. Cl.³ .............................................. B62D 53/00
[52] U.S. Cl. ................................... 280/404; 403/109; 403/112; 280/656
[58] Field of Search .................. 280/404, 656, 478 R, 280/478 A, 478 B; 403/109, 112

[56] References Cited

U.S. PATENT DOCUMENTS

| 1,338,546 | 4/1920 | Allen | 280/404 |
| 2,733,935 | 2/1956 | Whiteley | 280/404 |
| 3,134,607 | 4/1964 | Doll | 280/656 |
| 3,606,744 | 9/1971 | Eubanks | 280/478 R |

FOREIGN PATENT DOCUMENTS 528417 11/1921 France ................................. 280/404

Primary Examiner—John P. Silverstrim
Attorney, Agent, or Firm—L. S. Van Landingham, Jr.

[57] ABSTRACT

An improved trailer is provided for use with an automotive draft vehicle. The trailer is of the class including a coupling member attached on its forward end to a draft vehicle and having a trailer rear axle assembly slidably mounted on the rear end so as to be movable longitudinally along the coupling pole between predetermined long-coupled and short-coupled positions to thereby adjust the effective length of the trailer. Improved coupling assemblies are also provided for adjusting the effective length of the trailer and maintaining the rear axle assembly in the adjusted positions.

18 Claims, 7 Drawing Figures

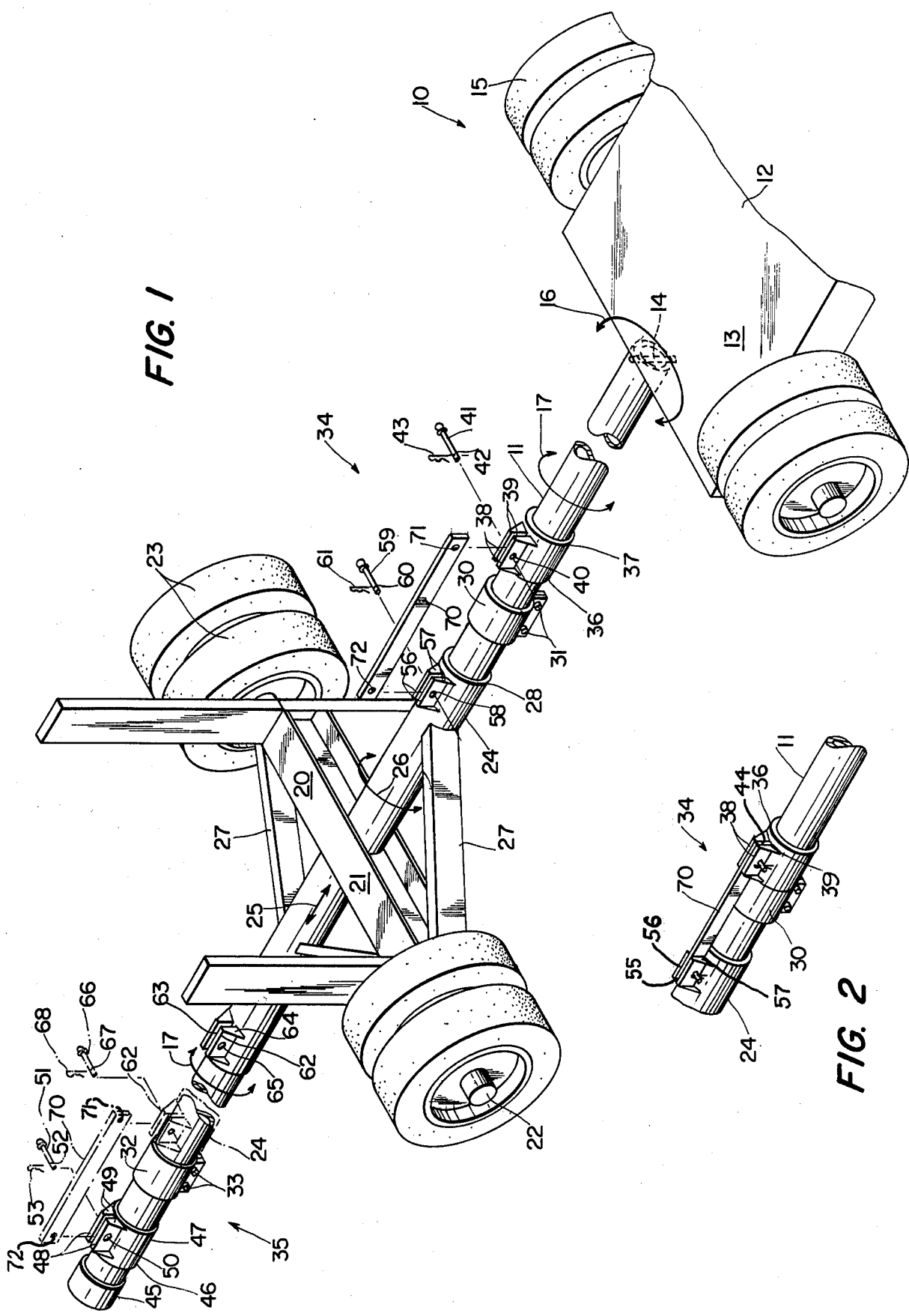

POLE TRAILER

THE BACKGROUND OF THE INVENTION

1. The Field of the Invention

The present invention broadly relates to trailers for automotive draft vehicles. In one of its more specific embodiments, the invention is concerned with trailers of the type frequently used for transporting poles and other lengthy objects which are adjustable in length from a long-coupled or loaded position to a short-coupled or running position, or vice versa. The invention is also concerned with an improved coupling means whereby the effective length of the trailer may be easily adjusted between predetermined long-coupled and short-coupled positions.

2. The Prior Art

A wide variety of trailers for automotive draft vehicles have been proposed heretofore. One class of prior art trailers includes an elongated coupling member having a rear axle assembly slidably mounted thereon so as to be movable between longitudinally spaced long-coupled and short-coupled positions to thereby adjust the effective length of the trailer. As is well known in this art, it is often desirable to increase the effective length of a trailer when it is to be loaded with elongated objects such as poles, and then decrease the effective length after the poles have been unloaded and it is desired to make a return trip at high speed for an additional load. It is necessary to adjust the unloaded trailer to the short-coupled position for the return trip at high speed as there is a pronounced tendency otherwise for the rear axle assembly to weave back and forth across the road and thereby increase driving hazards. The general driving and operating conditions are also adversely affected when unloaded and operating at high speed in the long-coupled position.

Various types of coupling assemblies have been proposed for the purpose of adjusting the effective length of a trailer between the short-coupled and long-coupled positions. However, the coupling assemblies available heretofore have not been entirely satisfactory. For example, some of the prior art coupling assemblies were difficult for one person to operate and a helper was needed. In other instances, the prior art coupling assemblies did not allow the trailer to be both towed and backed by the draft vehicle in the short-coupled and/or the long-coupled positions, thereby greatly limiting the usefulness of the trailer under road and operating conditions where both forward and rearward movement of the trailer are highly desirable. In still other instances, the prior art coupling assemblies did not provide for transverse relative angular movement around the longitudinal axes of the coupling member and the rear axle assembly. This resulted in severe stress and strain and ultimate mechanical failure due to the relative angular movement imparted to the coupling member by the wheels of the draft vehicle, and to the rear axle assembly by the rear trailer wheels, when passing over rough terrain.

In view of the foregoing, an entirely satisfactory trailer for an automotive draft vehicle of the class described was not available prior to the present invention in spite of the long existing and great need therefor.

THE SUMMARY OF THE INVENTION

The present invention overcomes the aforementioned disadvantages and deficiencies of the prior art. This is accomplished by providing a trailer for an automotive draft vehicle of the class described wherein improved forward and/or rear coupling assemblies are provided for adjusting the effective length of the trailer in the short-coupled and/or long-coupled positions. The coupling assemblies allow the effective length of the trailer to be easily and rapidly adjusted by the driver of the draft vehicle and without the need for a helper. The resultant improved trailer is capable of being both towed and backed by the automotive draft vehicle in either the short-coupled or long-coupled positions, thereby enabling the driver to operate more effectively and efficiently under the adverse conditions often encountered in the field. The improved coupling assemblies also allow relative transverse angular movement around the longitudinal axes of the coupling member and rear axle assembly. Thus, the relative angular movement imparted thereto by the wheels of the draft vehicle and the wheels of the rear axle assembly when passing over rough terrain does not cause stress and strain and mechanical failure is avoided.

Reference may be had to the following detailed description of the invention and the accompanying illustrative drawings for a more thorough and complete understanding of the invention.

THE BRIEF DESCRIPTION OF THE ACCOMPANYING DRAWINGS

The invention will be described hereinafter in greater particularity with reference to the presently preferred embodiments thereof illustrated in the accompanying drawings, wherein:

FIG. 1 is a perspective view of the improved trailer for an automotive draft vehicle of the invention, wherein portions thereof are broken away, shown in phantom line, or illustrated in exploded view for purposes of clarity;

FIG. 2 is a perspective view of the forward coupling unit illustrated in exploded view in FIG. 1, wherein the component elements thereof are assembled and in the positions assumed when the trailer is in the short-coupled position and is being towed by the automotive draft vehicle;

Figure 3:
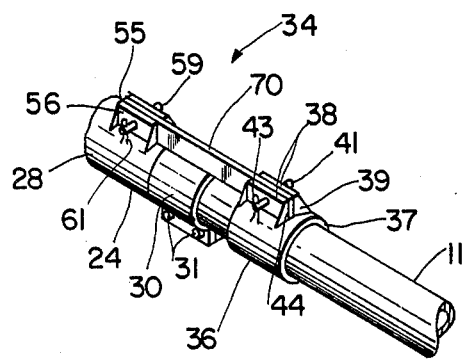
FIG. 3 is a perspective view of the assembled forward coupling unit which is similar to FIG. 2, but with the assembled component elements thereof being in the positions assumed when the trailer is in the short-coupled position and is being backed by the automotive draft vehicle.

The aforementioned seven figures of the drawings are referred to and discussed hereinafter in greater detail.

THE DETAILED DESCRIPTION OF THE INVENTION INCLUDING THE PRESENTLY PREFERRED VARIANTS AND EMBODIMENTS THEREOF

Referring now to the drawings, one presently preferred embodiment of the improved trailer for an automotive draft vehicle of the invention generally designated as 10 includes an elongated tubular coupling member or pole 11 which is attached on its forward end to the automotive draft vehicle 12. The draft vehicle 12 is of conventional construction and includes a rear axle assembly 13 on which is mounted prior art means (not shown) for attaching the forward end of coupling pole 11 thereto so as to be capable of relative substantially horizontal angular movement in the directions of the arrows 16, and also prior art means (not shown) for supporting and retaining the forward ends of a load of elongated cargo members thereon such as logs, telephone poles, and the like. Numerous U.S. patents disclose suitable prior art constructions for these purposes, such as U.S. Pat. Nos. 1,953,052 and 3,712,642, the disclosures of which are incorporated herein by reference. For instance, the forward end of coupling pole 11 may have a vertical opening therein for receiving pin 14 and thereby attaching the same to the rear of vehicle 12 so as to provide for horizontal swinging movement in the directions of the arrows 16. The forward end of coupling pole 11 is also supported and attached to vehicle 12 whereby as the wheels 15 carried by rear axle assembly 13 pass over rough terrain and thus are raised and lowered, the coupling pole 11 is caused to rotate back and forth around its longitudinal axis in the directions of the arrows 17.

The coupling pole 11 has a trailer rear axle assembly 20 slidably mounted thereon so as to be movable longitudinally along the coupling pole 11. The trailer rear axle assembly 20 includes a cross beam 21 and an axle 22 on which wheels 23 are rotatably mounted. The trailer rear axle assembly 20 also includes a tubular member 24 which has a diameter sufficiently large to easily receive the coupling pole 11, and is slidably mounted thereon for longitudinal movement back and forth in the direction of the arrows 25. As the wheels 23 roll over rough terrain and thus are raised and lowered, the resultant transverse angular or rotary movement in the direction of arrows 26 causes the tubular member 24 to rotate back and forth around its longitudinal axis. Thus the coupling pole 11 and the tubular member 24 are subjected to relative angular or rotary movement therebetween in the general direction of arrows 17 and 26 as the wheels 23 of trailer 10 and the wheels 15 of automotive draft vehicle 12 traverse uneven terrain such as is often encountered in logging and other off-the-road operations. The coupling pole 11 and tubular member 24 are also subject to severe stress and strain which will ultimately cause a mechanical failure if this relative movement is not permitted therebetween. This is true since the forward end of coupling pole 11 is so attached to vehicle 12 that it is not free to rotate around its longitudinal axis in the directions of arrows 17, and since the cylindrical wall 28 of tubular member 24 is rigidly attached to cross beam 21 and braces 27 which extend therebetween and thus is not free to rotate around its longitudinal axis in the direction of arrows 26.

The coupling pole 11 has a forward clamp 30 which is rigidly mounted thereon by means of bolts 31, and thus the clamp 30 is not free to rotate around coupling pole 11 or move longitudinally therealong. The coupling pole 11 is also provided with a rear clamp 32 which is of similar construction to clamp 30. Clamp 32 is rigidly mounted on coupling pole 11 by bolts 33, and thus it also does not rotate around coupling pole 11 or move longitudinally therealong. The clamps 30 and 32 have cross sectional configurations and dimensions whereby they are larger than the internal diameter of wall 28. Therefore, the clamp 30 defines the limit of forward longitudinal movement of the trailer rear axle assembly 20 along the coupling pole 11 when the trailer rear axle assembly 20 is moved to the short-coupled or forward position. Similarly, the clamp 32 defines the limit of rearward longitudinal movement of the trailer rear axle assembly 20 along the coupling pole 11 when the trailer rear axle assembly 20 is moved to the long-coupled or rear position.

Figure 5:
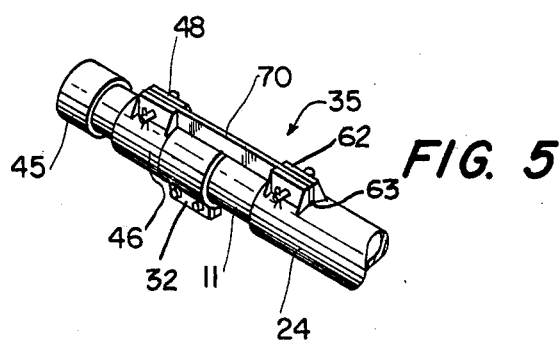
FIG. 5 is a perspective view of the assembled rear coupling unit which is similar to FIG. 4, but with the assembled component elements thereof being in the positions assumed when the trailer is in the long-coupled position and is being backed by the automotive draft vehicle.
Figure 6:
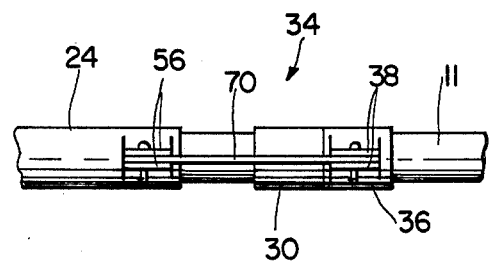
FIG. 6 is a top view of the assembled forward coupling unit illustrated in FIG. 2, further illustrating the positions assumed by the assembled component elements thereof when the trailer is in the short-coupled position and is being towed by the automotive draft vehicle.

The trailer rear axle assembly 20 is retained in the short-coupled or forward position by means of the forward coupling assembly generally designated as 34, the component elements of which are further illustrated in FIGS. 2, 3 and 6 of the drawings. The trailer rear axle assembly 20 is maintained in the long-coupled or rear position by means of the rear coupling assembly generally designated as 35, the component elements of which are further illustrated in FIGS. 4, 5 and 7 of the drawings. It will be apparent that the rear axle assembly 20 is relatively near the automotive draft vehicle 12 when retained in the short-coupled position by means of forward coupling assembly 34, and is relatively distant from the automotive draft vehicle 12 when retained in the long-coupled position by means of rear coupling assembly 35.

A sleeve-like coupling element 36 having an internal diameter sufficiently large to easily receive the coupling pole 11 is slidably and rotatably mounted on coupling pole 11 forward of the clamp 30. The coupling element 36 is mounted whereby it rotates easily on coupling pole 11 and is capable of sliding freely therealong. The coupling element 36 has a cylindrical wall 37 which encompasses the coupling pole 11 and extends longitudinally with respect thereto. A pair of spaced elongated members 38 extend longitudinally along the upper outer surface of wall 37 and outward therefrom to thereby form a slot 44. The spaced members 38 are rigidly attached to the wall 37 and are provided with transversely extending braces 39 which are rigidly attached to members 38 and the wall 37. The spaced members 38 are also provided with aligned openings 40 which receive pin 41. The pin 41 has an opening 42 in the end thereof which receives cotter pin 43 and assures that the pin 41 is retained in openings 40. The configuration and transverse dimensions of clamp 30 are greater than the internal diameter of cylindrical wall 37, and thus clamp 30 defines the limit of rearward movement of the coupling element 36 along the coupling pole 11. The coupling element 36 is free to slide longitudinally along the coupling pole 11 between the clamp 30 and the point of attachment of the forward end of coupling pole 11 to the rear of vehicle 12.

A sleeve-like rear coupling element 46, which is similar in construction and operation to coupling element 36, is rotatably and slidably mounted on coupling pole 11 between the clamp 32 and the terminal cap 45. The coupling element 46 likewise includes a cylindrical wall 47 having an internal diameter sufficiently large to easily receive the coupling pole 11. The coupling element 46 is free to rotate on coupling pole 11 and to slide longitudinally therealong between the clamp 32 and the cap 45. The cross sectional configurations and outer diameters of clamp 32 and cap 45 are larger than the internal diameter of cylindrical wall 47 and are not received thereby. Thus, the clamp 32 defines the limit of forward movement of coupling element 46 and the cap 45 defines the limit of rearward movement of coupling element 46 along coupling pole 11. Spaced elongated members 48 are mounted on the upper outer surface of wall 47, and extend longitudinally therealong and outward therefrom to thereby form a slot 54. The spaced members 48 are rigidly attached to wall 47, and are provided with transversely extending braces 49 which are rigidly attached thereto and to wall 47. The spaced members 48 are also provided with aligned openings 50 which receive pin 51. The pin 51 has an opening 52 near the end thereof which receives cotter pin 53 to thereby assure that pin 51 is retained in openings 50.

The forward end of cylindrical wall 28 has a pair of spaced elongated members 56 rigidly attached to the upper outer surface thereof. The members 56 extend longitudinally along the outer surface of wall 28 and outward therefrom to thereby form a slot 55, and are provided with transversely extending braces 57 which are rigidly attached thereto and to the wall 28. The members 56 are also provided with aligned openings 58 which receive pin 59. The outer end of pin 59 has an opening 60 formed therein which receives cotter pin 61 to thereby assure that it is retained within the openings 60.

The rear end of cylindrical wall 28 is provided with a pair of spaced elongated members 62 which are similar to spaced members 56. The spaced members 62 are rigidly attached to the upper outer surface of wall 28 and in spaced relationship and extend outward to form a slot 63 therebetween. The longitudinally extending elongated members 62 are provided with transversely extending braces 64 which are rigidly attached thereto and to wall 28. The braces 64 are provided with aligned openings 65 which receive pin 66. An opening 67 is formed in the outer end of pin 66 which receives cotter pin 68 to thereby assure pin 66 is retained in openings 65.

As illustrated in FIGS. 2, 3 and 6 of the drawings, when the trailer rear axle assembly 20 is in the short-coupled position a bar 70 having an opening 71 near the forward end thereof and an opening 72 near the rear end thereof is provided for connecting the spaced members 38 on the forward coupling element 36 to the spaced members 56 carried by the forward end of tubular member 24. The connecting bar 70 is placed within slots 44 and 55, the openings 71 and 72 are aligned with the openings 40 and 58, the pins 41 and 59 are inserted therethrough, and the cotter pins 43 and 61 are inserted through openings 42 and 60, respectively. When the elements of forward coupling assembly 34 are thus connected and in the positions illustrated in FIGS. 2 and 6, the trailer 10 may be towed by automotive draft vehicle 12 in the short-coupled position. Similarly, the trailer 10 may be backed by automotive draft vehicle 12 in the short-coupled position when the components of forward coupling assembly 34 are in the positions illustrated in FIG. 3.

Figure 4:
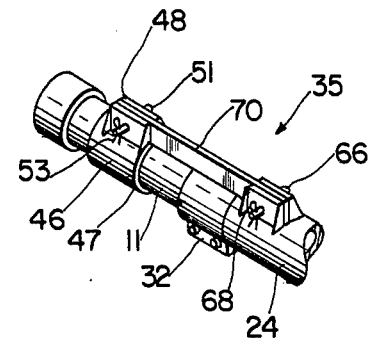
FIG. 4 is a perspective view of the rear coupling unit illustrated in exploded view and in phantom line in FIG. 1, wherein the component elements thereof are assembled and in the positions assumed when the trailer is in the long-coupled position and is being towed by the automotive draft vehicle.
Figure 7:
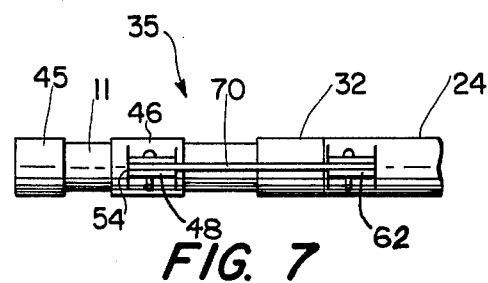
FIG. 7 is a top view of the assembled rear coupling unit illustrated in FIG. 4, further illustrating the positions assumed by the assembled component elements thereof when the trailer is in the long-coupled position and is being towed by the automotive draft vehicle.

When it is desired to move the trailer rear axle assembly 20 from the above described short-coupled position to the long-coupled position, the cotter pins 43 and 61 are removed from openings 42 and 60, the pin 41 is removed from the aligned openings 40 and 71, the pin 59 is removed from the aligned openings 58 and 72, and the bar 70 is removed from slots 44 and 55, respectively. Thereafter, as illustrated in FIGS. 4 and 7 of the drawings, the draft vehicle 12 and the coupling pole 11 attached thereto are pulled forward until the rear clamp 32 contacts, or nearly contacts, the rear end of tubular member 24. The connecting bar 70 is then placed in slots 54 and 63, the openings 65 and 71 are aligned and the pin 66 is inserted therethrough, the coupling element 46 is moved longitudinally along coupling pole 11 until the openings 50 and 72 are aligned and the pin 51 is inserted therethrough, and the cotter pins 53 and 68 are inserted through openings 52 and 67, respectively. Thereafter, the trailer 10 may be towed by the automotive draft vehicle 12 when the components of rear coupling assembly 35 are in the positions illustrated in FIGS. 4 and 7. Similarly, the trailer 10 may be backed by automotive draft vehicle 12 when the components of rear coupling assembly 35 are in the positions illustrated in FIG. 5.

When it is desired to move the trailer rear axle assembly 20 from the above described long-coupled position to the short-coupled position, the cotter pins 53 and 68 are removed from the openings 52 and 67, the pin 51 is removed from openings 50 and 72, the pin 66 is removed from the openings 65 and 71, and the connecting bar 70 is removed from slots 54 and 63. Thereafter, the automotive draft vehicle and the coupling pole 11 attached thereto are backed until the forward clamp 30 strikes, or nearly strikes, the forward end of tubular member 24. The connecting bar 70 is then placed in slots 44 and 55, the openings 58 and 72 are aligned and the pin 59 is inserted therethrough, the coupling element 36 is moved longitudinally along coupling pole 11 until the openings 40 and 71 are in alignment and pin 41 is inserted therethrough, and the cotter pins 43 and 61 are inserted through the openings 42 and 60, respectively. Thereafter, the trailer may be towed or backed by draft vehicle 12 in the short-coupled position, as previously described in connection with FIGS. 2, 3 and 6.

In view of the foregoing discussion, it is apparent that the driver of the draft vehicle 12 does not need a helper for the purpose of moving the trailer rear axle assembly 20 from the short-coupled position to the long-coupled position, or vice versa. The driver merely removes the connecting bar 70 from the coupling assembly 34 or 35, as the case may be, and either pulls the draft vehicle 12 forward or backs the same until the trailer rear axle assembly 20 is in the desired short-coupled or long-coupled position as determined by the clamps 30 and 32, respectively. Thereafter, the driver of the draft vehicle 12 connects the bar 70 in the proper position in coupling assembly 34 or 35 as previously described.

The coupling assemblies 34 and 35 allow relative transverse angular or rotary movement around the longitudinal axes of the coupling pole 11 and the tubular member 24 of the trailer rear axle assembly 20. This eliminates stress and strain therebetween, and mechanical failure is avoided when traversing rough terrain.

For example, the rotary movement imparted to coupling pole 11 in the directions of arrows 17 when wheels 15 roll over rough terrain merely causes the coupling pole 11 to rotate back and forth around its longitudinal axis within coupling elements 36 and 46 and tubular member 24. Similarly, the rotary movement imparted to tubular member 24 and coupling elements 36 and 46 in the directions of arrows 17 when wheels 23 roll over rough terrain merely causes the tubular member 24 and the coupling elements 36 and 46 to rotate back and forth around coupling pole 11 and their longitudinal axes. It is also also apparent that, upon loosening bolts 31 and 33, the clamps 30 and 32, respectively, may be moved longitudinally back and forth along coupling pole 11 to different desired positions. The bolts 31 and 33 are then retightened to securely retain the clamps 30 and 32 in the new positions. This added feature of the invention allows the trailer 10 to be adjusted to the most efficient short-coupled and long-coupled positions.

The foregoing detailed discussion and the accompanying drawings are for purposes of illustration only, and are not intended as being limiting to the spirit or scope of the appended claims.

We claim:

1. In a trailer for an automotive draft vehicle, said trailer including an elongated coupling member having a longitudinally extending axis, means adapted to connect a forward end of said coupling member to said vehicle, and a rear axle assembly mounted on said coupling member for slidable movement along said axis and rotatable movement about said axis, the improvement comprising:

stop means fixed to said coupling member forward of said axle assembly, said stop means limiting forward sliding movement of said axle assembly by abutment therewith; a coupling element mounted on said coupling member forward of said stop means for slidable movement along said axis and rotatable movement about said axis; first attaching means on said axle assembly; second attaching means on said coupling element; an elongated removable connecting member; first detachable means for connecting one end of said connecting member to said first attaching means; and second detachable means for connecting the other end of said connecting member to said second attaching means, said connecting member and said stop means being shaped such that with said connecting member attached to said axle assembly and said coupling element, said axle assembly and said coupling element are free to rotate about said axis relative to said stop means through an arc substantially greater than 180° and the rearward sliding movement of said axle assembly is limited by said coupling element abutting said stop means.

2. The trailer of claim 1 wherein the said trailer rear axle assembly and the said coupling element are freely rotatable back and forth on the said coupling member and the said coupling member is freely rotatable back and forth around its longitudinal axis while the said trailer rear axle assembly and coupling element are rotatably mounted thereon through an arc in each instance which lies in a vertical plane which is substantially perpendicular to a vertical plane passing through the longitudinal axis of the said coupling member.

3. The trailer of claim 1 wherein the said coupling member is of tubular construction and a transverse cross-section taken therethrough has a generally annular outside diameter, and the said trailer rear axle assembly and the said coupling element include tubular mounting means having generally annular internal diameters of sizes which easily receive the outside diameter of the said coupling member whereby they are slidably and rotatably mounted thereon.

4. The trailer of claim 1 wherein the said stop means includes adjustable mounting means and the said adjustable mounting means is easily slidable along the said coupling member and is capable of mounting the said stop means thereon at a desired point.

5. The trailer of claim 1 wherein the said stop means includes adjustable mounting means, the said adjustable mounting means is easily slidable along the said coupling member and is capable of mounting the said stop means thereon at a desired point, the said coupling member is of tubular construction and a transverse cross section taken therethrough has a generally annular outside diameter, and the said trailer rear axle assembly and the said coupling element include tubular mounting means having generally annular internal diameters of sizes which easily receive the outside diameter of the said coupling member whereby they are slidably and rotatably mounted thereon.

6. The trailer of claim 1 wherein the said stop means includes adjustable mounting means, the said adjustable mounting means is easily slidable along the said coupling member and is capable of mounting the said stop means thereon at a desired point, the said coupling member is of tubular construction and a transverse cross section taken therethrough has a generally annular outside diameter, the said trailer rear axle assembly and the said coupling element include tubular mounting means having generally annular internal diameters of sizes which easily receive the outside diameter of the said coupling member whereby they are slidably and rotatably mounted thereon, the said first and second attaching means include longitudinally extending spaced projections having transversely extending aligned openings therein carried by the upper surface of the forward end portion of the trailer rear axle assembly and the upper surface of the coupling element, the said connecting member is a bar having openings in the forward end and rear end portions thereof, and the said first and second detachable means include pins inserted through the said aligned openings of the first and second attaching means and the said openings in the bar.

7. In a trailer for an automotive draft vehicle, said trailer including an elongated coupling member having a longitudinally extending axis, means adapted to connect a forward end of said coupling member to said vehicle, and a rear axle assembly mounted on said coupling member for slidable movement along said axis and rotatable movement about said axis, the improvement comprising:

stop means fixed to said coupling member rearward of said axle assembly, said stop means limiting rearward sliding movement of said axle assembly by abutment therewith; a coupling element mounted on said coupling member rearward of said stop means for slidable movement along said axis and rotatable movement about said axis; first attaching means on said axle assembly; second attaching means on said coupling element; an elongated removable connecting member; first detachable means for connecting one end of said connecting member to said first attaching means; and second detachable means for connecting the other end of said connecting member to said second attaching means, said connecting member and said stop means being shaped such that with said connecting member attached to said axle assembly and said coupling element, said axle assembly and said coupling element are free to rotate about said axis relative to said stop means through an arc substantially greater than 180° and the forward sliding movement of said axle assembly is limited by said coupling element abutting said stop means.

8. The trailer of claim 7 wherein the said trailer rear axle assembly and the said coupling element are freely rotatable back and forth on the said coupling member and the said coupling member is freely rotatable back and forth around its longitudinal axis while the said trailer rear axle assembly and coupling element are rotatably mounted thereon through an arc in each instance which lies in a vertical plane which is substantially perpendicular to a veritical plane passing through the longitudinal axis of the said coupling member.

9. The trailer of claim 7 wherein the said coupling member is of tubular construction and a transverse cross section taken therethrough has a generally annular outside diameter, and the said trailer rear axle assembly and the said coupling element include tubular mounting means having generally annular internal diameters of sizes which easily receive the outside diameter of the said coupling member whereby they are slidably and rotatably mounted thereon.

10. The trailer of claim 7 wherein the said stop means includes adjustable mounting means and the said adjustable mounting means is easily slidable along the said coupling member and is capable of mounting the said stop means thereon at a desired point.

11. The trailer of claim 7 wherein the said stop means includes adjustable mounting means, the said adjustable mounting means is easily slidable along the said coupling member and is capable of mounting the said stop means thereon at a desired point, the said coupling member is of tubular construction and a transverse cross section taken therethrough has a generally annular outside diameter, and the said trailer rear axle assembly and the said coupling element include tubular mounting means having generally annular internal diameters of sizes which easily receive the outside diameter of the said coupling member whereby they are slidably and rotatably mounted thereon.

12. The trailer of claim 7 wherein the said stop means includes adjustable mounting means, the said adjustable mounting means is easily slidable along the said coupling member and is capable of mounting the said stop means thereon at a desired point, the said coupling member is of tubular construction and a transverse cross section taken therethrough has a generally annular outside diameter, the said trailer rear axle assembly and the said coupling element include tubular mounting means having generally annular internal diameters of sizes which easily receive the outside diameter of the said coupling member whereby they are slidably and rotatably mounted thereon, the said first and second attaching means include longitudinally extending spaced projections having transversely extending aligned openings therein carried by the upper surface of the forward end portion of the trailer rear axle assembly and the upper surface of the coupling element, the said connecting member is a bar having openings in the forward end and rear end portions thereof, and the said first and second detachable means include pins inserted through the said aligned openings of the first and second attaching means and the said openings in the bar.

13. In a trailer for an automotive draft vehicle, said trailer including an elongated coupling member having a longitudinally extending axis, means adapted to connect a forward end of said coupling member to said vehicle, and a rear axle assembly mounted on said coupling member for slidable movement along said axis and rotatable movement about said axis, the improvement comprising:

first stop means fixed to said coupling member forward of said axle assembly, said first stop means limiting forward sliding movement of said axle assembly by abutment therewith; a first coupling element mounted on said coupling member forward of said first stop means for slidable movement along said axis and rotatable movement about said axis; first attaching means on said axle assembly; second attaching means on said first coupling element; an elongated removable connecting member; first detachable means including means for connecting one end of said connecting member to said first attaching means; and second detachable means including means for connecting the other end of said connecting member to said second attaching means, said connecting member and said first stop means being shaped such that with said connecting member attached to said axle assembly and said first coupling element, said axle assembly and said first coupling element are free to rotate about said axis relative to said first stop means through an arc substantially greater than 180° and the rearward sliding movement of said axle assembly is limited by said first coupling element abutting said first stop means;

second stop means fixed to said coupling member rearward of said axle assembly, said second stop means limiting rearward sliding movement of said axle assembly by abutment therewith; a second coupling element mounted on said coupling member rearward of said second stop means for slidable movement along said axis and rotatable movement about said axis; third attaching means on said axle assembly; fourth attaching means on said second coupling element; said first detachable means including means for connecting an end of said connecting member to said third attaching means; and said second detachable means including means for connecting the other end of said connecting member to said fourth attaching means, said connecting member and said second stop means being shaped such that with said connecting member attached to said axle assembly and said second coupling element, said axle assembly and said second coupling element are free to rotate about said axis relative to said second stop means through an arc substantially greater than 180° and the forward sliding movement of said axle assembly is limited by said second coupling element abutting said second stop means.

14. The trailer of claim 13 wherein the said trailer rear axle assembly and the said first and second coupling elements are freely rotatable back and forth on the said coupling member and the said coupling member is freely rotatable back and forth around its longitudinal axis while the said trailer rear axle assembly and the said first and second coupling elements are rotatably mounted thereon through an arc in each instance which lies in a vertical plane which is substantially perpendicular to a vertical plane passing through the longitudinal axis of the said coupling member.

15. The trailer of claim 13 wherein the said coupling member is of tubular construction and a transverse cross section taken therethrough has a generally annular outside diameter, and the said trailer rear axle assembly and the said first and second coupling elements include tubular mounting means having generally annular internal diameters of sizes which easily receive the outside diameter of the said coupling member whereby they are slidably and rotatably mounted thereon.

16. The trailer of claim 13 wherein the said first and second stop means include adjustable mounting means for adjusting the distance therebetween along the said coupling member, and the said adjustable mounting means is easily slidable along the said coupling member and is capable of mounting the said first and second stop means thereon at any desired points.

17. The trailer of claim 13 wherein the said first and second stop means include adjustable mounting means for adjusting the distance therebetween along the said coupling member, the said adjustable mounting means is easily slidable along the said coupling member and is capable of mounting the said first and second stop means thereon at any desired points, the said coupling member is of tubular construction and a transverse cross section taken therethrough has a generally annular outside diameter, and the said trailer rear axle assembly and the said first and second coupling elements include tubular mounting means having generally annular internal diameters of sizes which easily receive the outside diameter of the said coupling member whereby they are slidably and rotatably mounted thereon.

18. The trailer of claim 13 wherein the said first and second stop means include adjustable mounting means for adjusting the distance therebetween along the said coupling member, the said adjustable mounting means is easily slidable along the said coupling member and is capable of mounting the said first and second stop means thereon at any desired points, the said coupling member is of tubular construction and a transverse cross section taken therethrough has a generally annular outside diameter, the said trailer rear axle assembly and the said first and second coupling elements include tubular mounting means having generally annular internal diameters of sizes which easily receive the outside diameter of the said coupling member whereby they are slidably and rotatably mounted thereon, the said first, second, third and fourth attaching means include longitudinally extending spaced projections having transversely extending aligned openings therein carried by the upper surface of the forward end and rear end portions of the trailer rear axle assembly and the upper surface of the said first and second coupling elements, the said connecting member is a bar having openings in the forward end and rear end portions thereof, and the said first and second detachable means include pins inserted through the said aligned openings of the said first and second attaching means and the said openings in the bar.

* * * * *